United States Patent
Ho

(10) Patent No.: US 6,203,160 B1
(45) Date of Patent: Mar. 20, 2001

(54) HIGH EFFICIENCY LIQUID CRYSTAL DISPLAY PROJECTION SYSTEM

(75) Inventor: Fang Chuan Ho, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/474,736

(22) Filed: Dec. 29, 1999

(30) Foreign Application Priority Data

Oct. 12, 1999 (TW) ................................. 88117561

(51) Int. Cl.[7] .............................................. G03B 21/14
(52) U.S. Cl. ................... 353/84; 353/20; 353/31; 348/743
(58) Field of Search .......................... 353/20, 31, 84; 349/9; 348/742, 743, 790

(56) References Cited

U.S. PATENT DOCUMENTS

| | | | |
|---|---|---|---|
| 5,042,925 | * 8/1991 | Broer et al. | 359/37 |
| 5,805,243 | * 9/1998 | Hatano et al. | 353/84 |
| 5,833,338 | * 11/1998 | Barak | 353/20 |
| 5,863,125 | * 1/1999 | Doany | 353/84 |
| 5,921,650 | * 7/1999 | Doany et al. | 353/84 |
| 5,982,541 | * 11/1999 | Li et al. | 353/20 |
| 5,984,478 | * 11/1999 | Doany et al. | 353/84 |
| 5,993,007 | * 11/1999 | Jung | 353/34 |
| 6,005,722 | * 12/1999 | Butterworth et al. | 353/84 |

* cited by examiner

Primary Examiner—William Dowling
(74) Attorney, Agent, or Firm—Beyer Weaver & Thomas, LLP

(57) ABSTRACT

A high efficiency liquid crystal display projection system is provided, which can effectively use the energy of s-polarized light and p-polarized light emitted from the light source. The high efficiency liquid crystal display projection system can simplify the structure of light splitting/combining prism by using the feature that the effective optical aperture of a reflective liquid crystal light valve is larger than 85%. Using a broadband polarizing beam-splitting prism to combine/split light, the volume of the liquid crystal display projection system is significantly reduced. The high efficiency liquid crystal display projection system comprises: a dichroic module for sequentially separating a white light into three primary-color lights; a broadband polarizing beam-splitting device for respectively transmitting and reflecting p-polarized light and s-polarized light of the three primary-color lights; two fast time response liquid crystal light valves for receiving and reflecting respectively the p-polarized light and the s-polarized light of the three primary-color lights so that the p-polarized light is converted to s-polarized light and the s-polarized light is converted to p-polarized light; and projection lenses for projecting the light beam to a screen after the s-polarized light and the p-polarized light reflected by the liquid crystal valves are respectively reflected and transmitted by the broadband polarizing beam-splitting device.

5 Claims, 3 Drawing Sheets

HIGH EFFICIENCY LIQUID CRYSTAL DISPLAY PROJECTION SYSTEM

BACKGROUND OF THE INVENTION

1. Field of the Invention

This invention relates to project systems, particularly to high efficiency liquid crystal display (LCD) projection systems.

2. Description of Prior Art

With the advent of commercially viable LCD projection systems, substantial research and development resources have been directed to LCD projection systems having higher brightness, higher pixel resolution, lighter weights, and lower cost. Recent developments have led to the development of reflective liquid crystal light valves, which can significantly increase aperture ratios. In IBM J. Res. Develop. Vol. 42, No. 3/4, 1998 by R. L. Melcher et al., LCD devices having pixel resolutions in accord with SXGA and QXGA format are disclosed.

Two subjects associated with the current design of optical devices are the design of light splitting/combining components and the effective use of light energy. Such light splitting and combining effects have been discussed by R. L. Melcher et al., in Micro LC Panel of S-V, Inc. and in the U.S. Pat. No. 5,786,937 to C. W. Chu et al. However, these technologies still have problems overcoming the requirements of low cost and high resolution. To that end, the U.S. Pat. No. 5,339,158 to Akiyama et al. discloses a single element called an "X-prism", which combines the light combining and light splitting effects such that the volume of the optical devices is significantly reduced. However, it is difficult to manufacture an X-prism.

Regarding other related art concerning the effective use of light source energy, the P/S converter disclosed in SID 97 Digest, pp. 993–996, 1997, by Itoh et al. is most widely used. Other polarization converters used in light sources are disclosed in U.S. Pat. Nos. 5,530,489 and 5,513,752.

The applicant has disclosed a liquid crystal display projection system which effectively uses light source energy. Referring to FIG. 1, a conventional liquid crystal display project system comprises: a light source 10; a visible light polarizing beam splitter 12; dichroic mirrors 14, 18 that reflect red light and transmit blue and green light; dichroic mirrors 16, 20 that reflect blue light and transmit green light; reflective liquid crystal panels 22, 24, 26, 28, 30, and 32; and projection lens 34. However, the structure of this conventional system has proven to be too complex.

SUMMARY OF THE INVENTION

Accordingly, one object of this invention is to provide a high efficiency liquid crystal display projection system that can effectively use the energy of s-polarized light and p-polarized light emitted from the light source.

Another object of this invention is to provide a high efficiency liquid crystal display projection system that can simplify the structure of light splitting/combining prism basing on the feature that the effective aperture ratio of a reflective liquid crystal light valve is larger than 85%.

The other object of this invention is to provide a high efficiency liquid crystal display projection system that can simplify the liquid crystal display projection system by using a ferro-electric liquid crystal panel having a fast time response.

To achieve the above objects, this invention uses a visible light broadband polarizing beam splitter, in which the s-polarized light and p-polarized light must meet the following requirement:

$R_S/R_P \geq 200$ $T_P/T_S \geq 200$

At the same time, instead of six liquid crystal panels used in a conventional liquid crystal display projection system, this invention uses two ferro-electric liquid crystal light valves having a fast time response, and uses a color disk to replace the dichroic filters used in the conventional liquid crystal display projection system. Furthermore, this invention uses a broadband polarizing beam-splitting prism to combine/split light. Therefore, the volume of the liquid crystal display projection system is significantly reduced. The cost is lowered and the structure is simplified.

BRIEF DESCRIPTION OF THE DRAWINGS

The following detailed description, given byway of example and not intended to limit the invention solely to the embodiments described herein, will best be understood in conjunction with the accompanying drawings in which.

DETAILED DESCRIPTION OF THE PREFERRED EMBODIMENTS

In order to simplify a liquid crystal display projection system, a ferro-electric liquid crystal light valve may advantageously be used since the ferro-electric liquid crystal light valve has a time response as high as 7 KHz.

Figure 1:
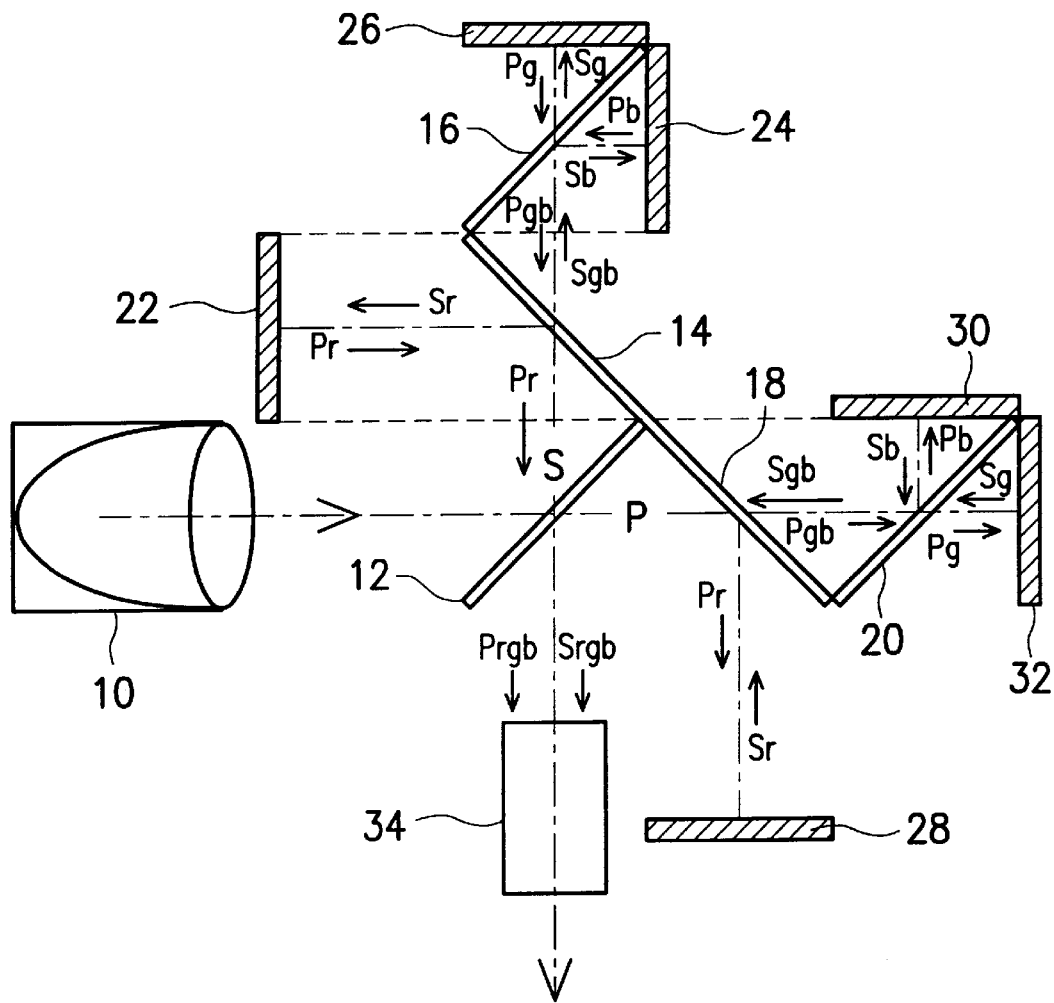
FIG. 1 is a diagram illustrating a conventional liquid crystal display projection system.
Figure 2:
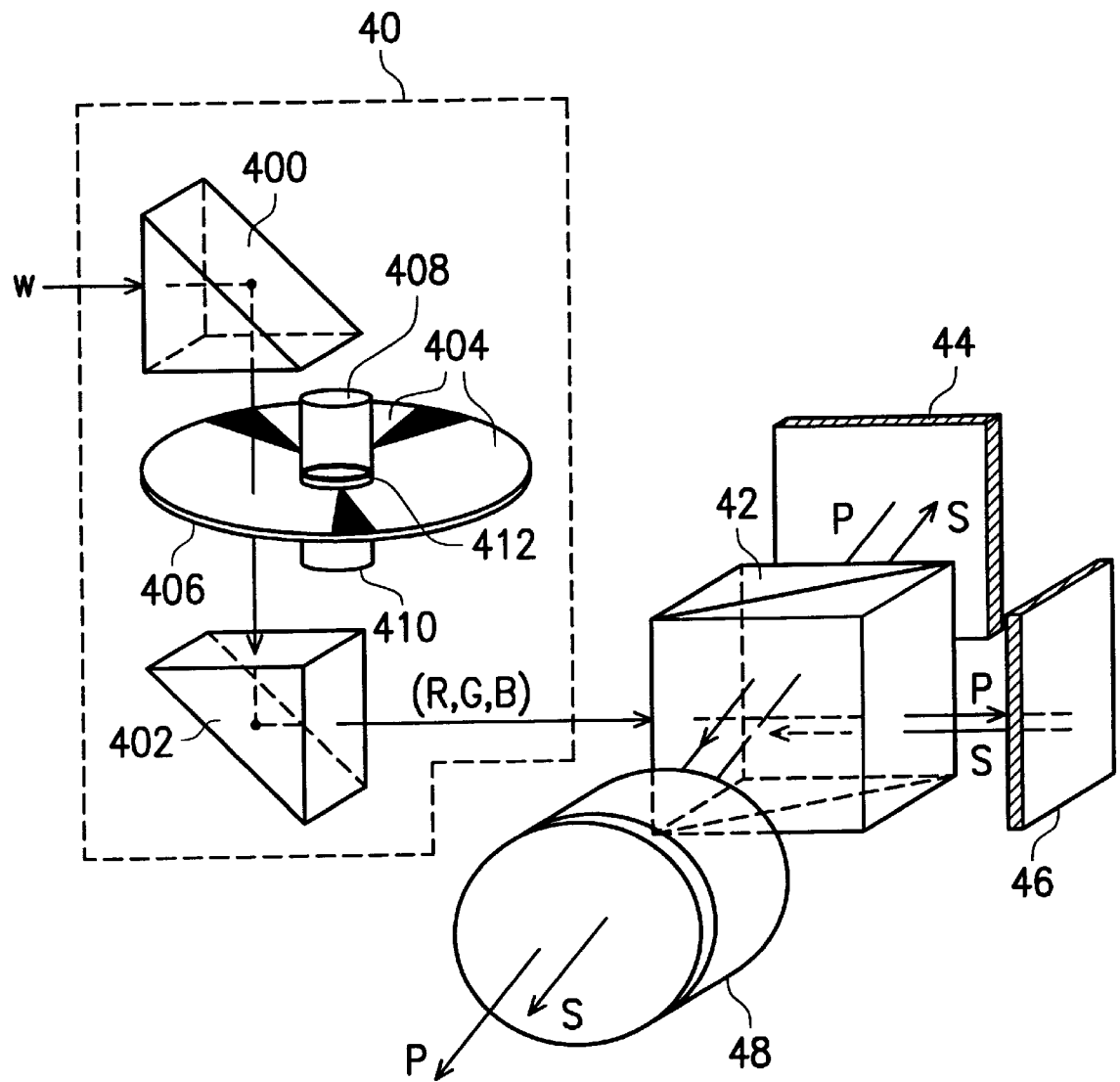
FIG. 2 is a diagram illustrating a high efficiency liquid crystal display projection system according to one embodiment of this invention.

Referring to FIG. 2, the high efficiency liquid crystal display projection system comprises: a dichroic module 40 for sequentially separating a white light into three primary-color lights; a broadband polarizing beam-splitting device 42 for respectively transmitting and reflecting p-polarized light and s-polarized light of the three primary-color lights; two fast time response liquid crystal light valves 44, 46 for receiving and reflecting respectively the p-polarized light and the s-polarized light of the three primary-color lights so that the p-polarized light is converted to s-polarized light and the s-polarized light is converted to p-polarized light; and a projection lens set 48 for projecting the light beam to a screen after the s-polarized light and the p-polarized light reflected by the liquid crystal valves 44, 46 are respectively reflected and transmitted by the broadband polarizing beam-splitting device 42.

The dichroic module 40 comprises: a first right-angle prism 400 for guiding the incident light; a second right-angle prism 402 for changing the direction of the light to the polarizing beam-splitting prism; R, G, B color filters 404 for respectively passing red light, green light and blue light; a rotary disk 406 for holding the R, G, B color filters 404; a frame 408 for supporting and accommodating the rotary disk 406; a holder 410 for fixedly holding the rotary disk 406; and a spindle motor 412 for driving the rotation of the rotary disk 406.

In this embodiment, the fast time response liquid crystal light valves 44, 46 are ferro-electric liquid crystal light valves.

The process of operating the high efficiency liquid crystal display projection system is as follows. Referring to FIG. 2, the unpolarized white light W emitted from the light source is totally reflected by the first right-angle prism 400 to pass the rotary disk 406 having R, G, B color filters 404. Then the light is totally reflected by the right-angle prism 402 and transmitted to the visible light polarizing beam-splitting device 42. The s-polarized light is reflected by the polarizing beam-splitting device 42 and enters the ferro-electric liquid crystal light valve 44. The s-polarized light is changed to p-polarized light after reflected by the ferro-electric liquid crystal light valve 44. The p-polarized light passes through the polarizing beam-splitting device 42 and then emerges through the projection lenses 48. On the other hand, the p-polarized light split by the polarizing beam-splitting device 42 passes through the polarizing beam-splitting device 42 and transmitted to the ferro-electric liquid crystal light valve 46. The p-polarized light is converted to s-polarized light after reflected by the ferro-electric liquid crystal light valve 46. The s-polarized light is reflected by the polarizing beam-splitting device 42 and then emerged by the projection lenses 48.

The color disk includes a rotary disk and R, G, B color filters having a structure similar to an optical disk. A user can insert or replace the color disk of the liquid crystal display projection system if necessary. When the address process of the ferro-electric liquid crystal light valves matches with the time sequence of the rotation of R, G, B color filters on the rotary disk, a full-color image can be projected to the screen.

Figure 3:
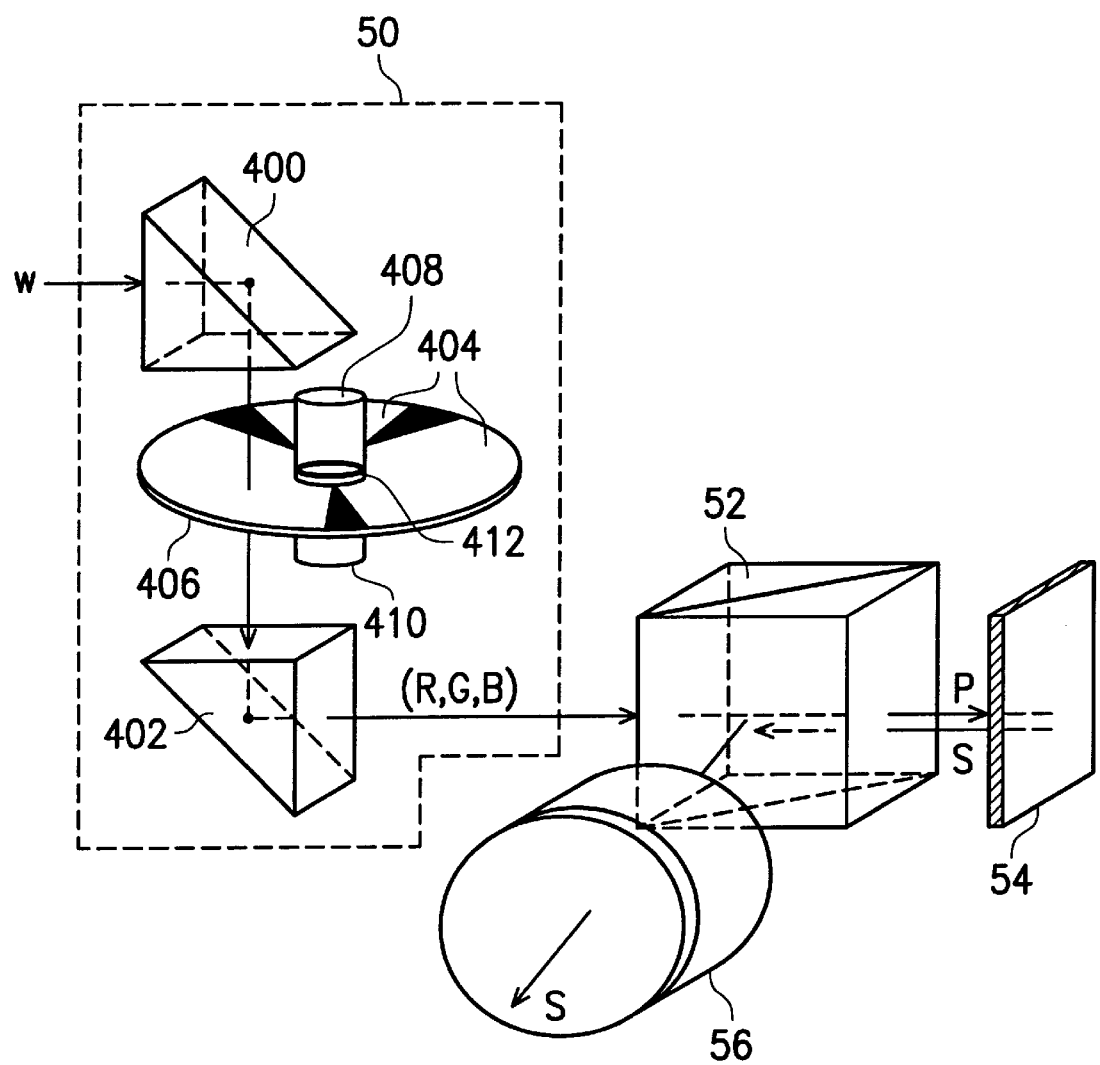
FIG. 3 is a diagram illustrating a high efficiency liquid crystal display projection system according to the other embodiment of this invention.

If the light source is polarized in the above embodiment, the structure of the high efficiency liquid crystal display projection system can be amended. Referring to FIG. 3, according to the second embodiment of this invention, the high efficiency liquid crystal display projection system comprises: a dichroic module 50 for sequentially separating a white light into three primary-color lights; a broadband polarizing beam-splitting device 52 for respectively transmitting and reflecting the polarized light of the three primary-color lights; a fast time response liquid crystal light valve 54 for receiving and reflecting respectively the polarized light of the three primary-color lights; and projection lenses 56 for projecting the light beam to a screen after the polarized light reflected by the liquid crystal valves 54 is reflected and transmitted by the broadband polarizing beam-splitting device 52.

To achieve high efficiency, this invention uses a visible light broadband polarizing beam splitter having a desired spectral characteristic. In the visible light broadband polarizing beam splitter, the reflectivity ratio of s-polarized light to p-polarized light is larger than 200. The structure of film system can be obtained by the following two $\lambda/4$ film stacks.

$(H_1L_1)^8(H_2L_2)^8$

Wherein the refractive indices of high refractive index film H, low refractive index film L, and the prism are respectively 2.25, 1.45, and 1.72. S-polarized light and p-polarized light must meet the following requirement:

$R_S/R_P \geq 200$ $T_P/T_S \geq 200$

Wherein, as is well known to practitioners having ordinary skill in the art, $R_S$ and $R_P$ refer to the reflection coefficients of S-polarized light and P-polarized light, respectively, and wherein $T_S$ and $T_P$ refer to the transmission coefficients of S-polarized light and P-polarized light, respectively.

Using the system presented in FIG. 2, when the images of a scene at different view angles are displayed on the ferro-electric liquid crystal light valves 44 and 46, the projection lenses can project the images to a specific screen to present a 3-dimensional image. Therefore, the high efficiency liquid crystal display projection system of this invention can serve as a 3-dimensional projection display system.

Compared with conventional liquid crystal display projection systems, this invention uses two ferro-electric liquid crystal light valves having a fast time response to replace six liquid crystal panels used in a conventional liquid crystal display projection system, and uses a color disk to replace the dichroic filter used in the conventional liquid crystal display projection system. Furthermore, this invention uses a broadband polarizing beam-splitting prism to combine/split light. Therefore, the volume of the liquid crystal display projection system is significantly reduced. The cost is lowered and the structure is simplified.

Moreover, this embodiment adopts an uni-directional high-speed spindle motor to improve the performance of the color disk.

In this invention, the color filters can be directly coated on the color disk. Furthermore, the color filters can be coated on blades, which are then fixedly mounted on the rotary disk by gluing or hot pressing.

Furthermore, since the color disk is replaceable, various color disks can be used to modify the chromaticity of projected images. The color disk can be combined with an optical disk such as a DVD or a VCD, thus the projection system can be integrated with an optical disk pickup system.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A high efficiency liquid crystal display projection system comprising:

a dichroic module comprising an optical disk and three primary-color filters formed on the optical disk, for sequentially separating a white light into three primary-color lights;

a broadband polarizing beam-splitting device for respectively transmitting and reflecting p-polarized light and s-polarized light of the three primary-color lights;

two fast time response liquid crystal light valves for receiving and reflecting respectively the p-polarized light and the s-polarized light of the three primary-color lights so that the p-polarized light is converted to s-polarized light and the s-polarized light is converted to p-polarized light; and projection lenses for projecting the light beam to a screen after the s-polarized light and the p-polarized light reflected by the liquid crystal valves are respectively reflected and transmitted by the broadband polarizing beam-splitting device.

2. A liquid crystal display projection system as claimed in claim 1 wherein the s-polarized light and the p-polarized light of the broadband polarizing beam-splitting device meets the following requirement:

$R_S/R_P \geq 200$, wherein $R_S$ refers to the reflection coefficient of the S-polarized light and wherein $R_P$ refers to the reflection coefficient of P-polarized light; and $T_P/T_S \geq 200$, wherein $T_P$ refers to transmission coefficient of P-polarized light and wherein $T_S$ refers to transmission coefficient of the S polarized light.

3. A liquid crystal display projection system as claimed in claim 1 wherein the fast time response liquid crystal light valve is a ferro-electric liquid crystal light valve.

4. A high efficiency liquid crystal display projection system comprising:

a dichroic module comprising an optical disk and three primary-color filters formed on the optical disk, for sequentially separating a white light into three primary-color lights;

a broadband polarizing beam-splitting device for respectively transmitting and reflecting the polarized light of the three primary-color lights;

a fast time response liquid crystal light valve for receiving and reflecting respectively the polarized light of the three primary-color lights; and projection lenses for projecting the light beam to a screen after the polarized light reflected by the liquid crystal valves is reflected and transmitted by the broadband polarizing beam-splitting device.

5. A liquid crystal display projection system as claimed in claim 4 wherein the fast time response liquid crystal light valve is a ferro-electric liquid crystal light valve.

* * * * *